US008566565B2

(12) United States Patent
Hooker et al.

(10) Patent No.: US 8,566,565 B2
(45) Date of Patent: Oct. 22, 2013

(54) MICROPROCESSOR WITH MULTIPLE OPERATING MODES DYNAMICALLY CONFIGURABLE BY A DEVICE DRIVER BASED ON CURRENTLY RUNNING APPLICATIONS

(75) Inventors: Rodney E. Hooker, Austin, TX (US); Colin Eddy, Round Rock, TX (US); G. Glenn Henry, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 1140 days.

(21) Appl. No.: 12/170,591

(22) Filed: Jul. 10, 2008

(65) Prior Publication Data

US 2010/0011198 A1     Jan. 14, 2010

(51) Int. Cl.
  *G06F 17/00*   (2006.01)
  *G06F 9/445*   (2006.01)

(52) U.S. Cl.
  USPC ............................................................. 712/43

(58) Field of Classification Search
  USPC .................................................. 712/43, 229
  See application file for complete search history.

(56) References Cited

U.S. PATENT DOCUMENTS

| | | | |
|---|---|---|---|
| 5,671,442 A * | 9/1997 | Feeney et al. .................... 710/14 |
| 6,240,468 B1 * | 5/2001 | Capelli ............................. 710/14 |
| 6,289,396 B1 * | 9/2001 | Keller et al. .................. 719/323 |
| 6,438,557 B1 | 8/2002 | Dent |
| 6,732,263 B1 * | 5/2004 | May et al. .......................... 713/1 |
| 6,948,050 B1 * | 9/2005 | Gove et al. ...................... 712/35 |
| 6,957,437 B1 * | 10/2005 | Bogia et al. .................... 719/327 |
| 7,366,891 B2 * | 4/2008 | Khanna et al. ..................... 713/2 |
| 7,418,582 B1 * | 8/2008 | Iacobovici et al. ............ 712/228 |
| 7,478,388 B1 * | 1/2009 | Chen et al. ......................... 718/1 |
| 7,558,723 B2 * | 7/2009 | Traut ............................... 703/24 |
| 7,774,531 B1 * | 8/2010 | Karlsson ........................ 710/220 |
| 2003/0093686 A1 * | 5/2003 | Barnes et al. .................. 713/200 |
| 2004/0177269 A1 * | 9/2004 | Belnet et al. ................... 713/200 |
| 2005/0138449 A1 * | 6/2005 | Katoh et al. ................... 713/320 |
| 2005/0210454 A1 * | 9/2005 | DeWitt et al. ................. 717/133 |
| 2006/0168590 A1 * | 7/2006 | Khanna et al. ................. 719/315 |
| 2006/0212609 A1 * | 9/2006 | Zimmer et al. .................. 710/14 |
| 2007/0043531 A1 * | 2/2007 | Kosche et al. ................. 702/182 |
| 2007/0226795 A1 * | 9/2007 | Conti et al. ..................... 726/22 |
| 2008/0104363 A1 * | 5/2008 | Raj et al. ........................ 711/207 |
| 2008/0162886 A1 * | 7/2008 | Saha et al. ..................... 712/214 |
| 2008/0163212 A1 * | 7/2008 | Zimmer et al. ............... 718/100 |
| 2010/0319001 A1 * | 12/2010 | Jones ............................. 718/108 |

* cited by examiner

Primary Examiner — Eric Coleman
(74) Attorney, Agent, or Firm — E. Alan Davis; James W. Huffman

(57) ABSTRACT

A computing system includes a microprocessor that receives values for configuring operating modes thereof. A device driver monitors which software applications currently running on the microprocessor are in a predetermined list and responsively dynamically writes the values to the microprocessor to configure its operating modes. Examples of the operating modes the device driver may configure relate to the following: data prefetching; branch prediction; instruction cache eviction; instruction execution suspension; sizes of cache memories, reorder buffer, store/load/fill queues; hashing algorithms related to data forwarding and branch target address cache indexing; number of instruction translation, formatting, and issuing per clock cycle; load delay mechanism; speculative page tablewalks; instruction merging; out-of-order execution extent; caching of non-temporal hinted data; and serial or parallel access of an L2 cache and processor bus in response to an instruction cache miss.

55 Claims, 2 Drawing Sheets

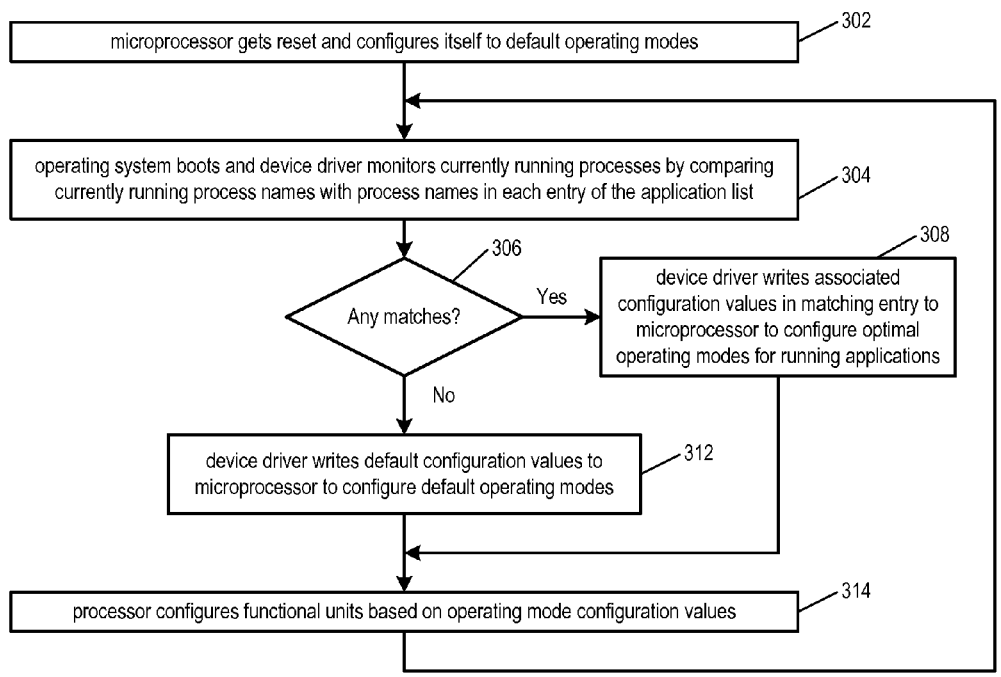

MICROPROCESSOR WITH MULTIPLE OPERATING MODES DYNAMICALLY CONFIGURABLE BY A DEVICE DRIVER BASED ON CURRENTLY RUNNING APPLICATIONS

FIELD OF THE INVENTION

The present invention relates in general to the field of microprocessors, and more specifically to a system and method for dynamically configuring the operating characteristics of a microprocessor based on the set of software applications currently running on the microprocessor.

BACKGROUND OF THE INVENTION

Microprocessor designers spend much effort on performance analysis. After architecting a microprocessor with a base set of features and performance targets based on previous generations of microprocessors, they execute a representative sample of the software applications that matter most to their customers and capture instruction execution traces of the software applications. They then use the captured traces as stimulus to simulate the operation of the microprocessor being designed. They may configure different characteristics of the simulated microprocessor in an effort to achieve the highest aggregate performance across all of the target software applications. Often, a particular configuration of characteristics is desirable for one target application and undesirable for another. In these cases, the designers make a decision as to which software application is more important, or find another approach that attempts to balance the needs of the multiple software applications. The choice often does not achieve the optimal performance of the target software applications since it may attempt to optimize the performance of one software application at the expense of another software application.

Once the best average set of operating parameter values has been identified, the microprocessor designers code them into the design with VHDL or Verilog code, for example. Other microprocessors improve on the hardcoded configuration by including a bank of fuses in the microprocessor that may be selectively blown during manufacturing of the microprocessor to alter the operating parameter values from their hardcoded values. This allows the microprocessor a limited degree of optimization in manufacturing, perhaps in response to new software applications or operating systems introduced after the microprocessor was designed. However, this solution still does not achieve the optimal performance of the target software applications in that it requires the designer/manufacturer to choose a configuration optimized for some applications at the expense of other applications, or to choose a balanced configuration that is likely not optimized for any applications.

BRIEF SUMMARY OF INVENTION

The present invention provides a device driver that dynamically configures the operating modes of the microprocessor during its operation to optimize performance and/or power consumption for currently executing software applications.

In one aspect, the present invention provides a computing system. The computing system includes a microprocessor configured to receive values for configuring operating modes of the microprocessor. The microprocessor is further configured to execute an operating system that controls which software applications are currently running on the microprocessor. The system also includes a device driver configured to monitor which of the software applications currently running on the microprocessor are in a predetermined list of software applications and to responsively dynamically write the values to the microprocessor to configure its operating modes.

In another aspect, the present invention provides a method for configuring a computing system having a microprocessor and a device driver. The method includes a microprocessor receiving values for configuring operating modes of the microprocessor. The microprocessor is configured to execute an operating system that controls which software applications are currently running on the microprocessor. The method also includes a device driver monitoring which of the software applications currently running on the microprocessor are in a predetermined list of software applications and dynamically writing the values to the microprocessor to configure its operating modes, in response to the monitoring step.

In another aspect, the present invention provides a computer program product for use with a computing device, the computer program product including a computer usable storage medium having computer readable program code embodied in the medium for specifying a computing system. The computer readable code includes first program code for specifying a microprocessor configured to receive values for configuring operating modes of the microprocessor and to execute an operating system that controls which software applications are currently running on the microprocessor. The computer readable code includes second program code for specifying a device driver configured to monitor which of the software applications currently running on the microprocessor are in a predetermined list of software applications and to responsively dynamically write the values to the microprocessor to configure its operating modes.

Examples of the operating modes the device driver may configure relate to the following: data prefetching; branch prediction; instruction cache eviction; instruction execution suspension; sizes of cache memories, reorder buffer, store/load/fill queues; hashing algorithms related to data forwarding and branch target address cache indexing; number of instruction translation, formatting, and issuing per clock cycle; load delay mechanism; speculative page tablewalks; instruction merging; out-of-order execution extent; caching of non-temporal hinted data; and serial or parallel access of an L2 cache and processor bus in response to an instruction cache miss.

An advantage of the present invention is that it potentially executes important software applications in a higher performance and/or lower power consuming manner than conventional systems.

BRIEF DESCRIPTION OF THE DRAWINGS

FIG. 2 is a block diagram illustrating various operating mode configuration values of the microprocessor of FIG. 1 according to the present invention.

FIG. 3 is a flowchart illustrating operation of the system of FIG. 1 according to the present invention.

DETAILED DESCRIPTION OF THE INVENTION

Figure 1:
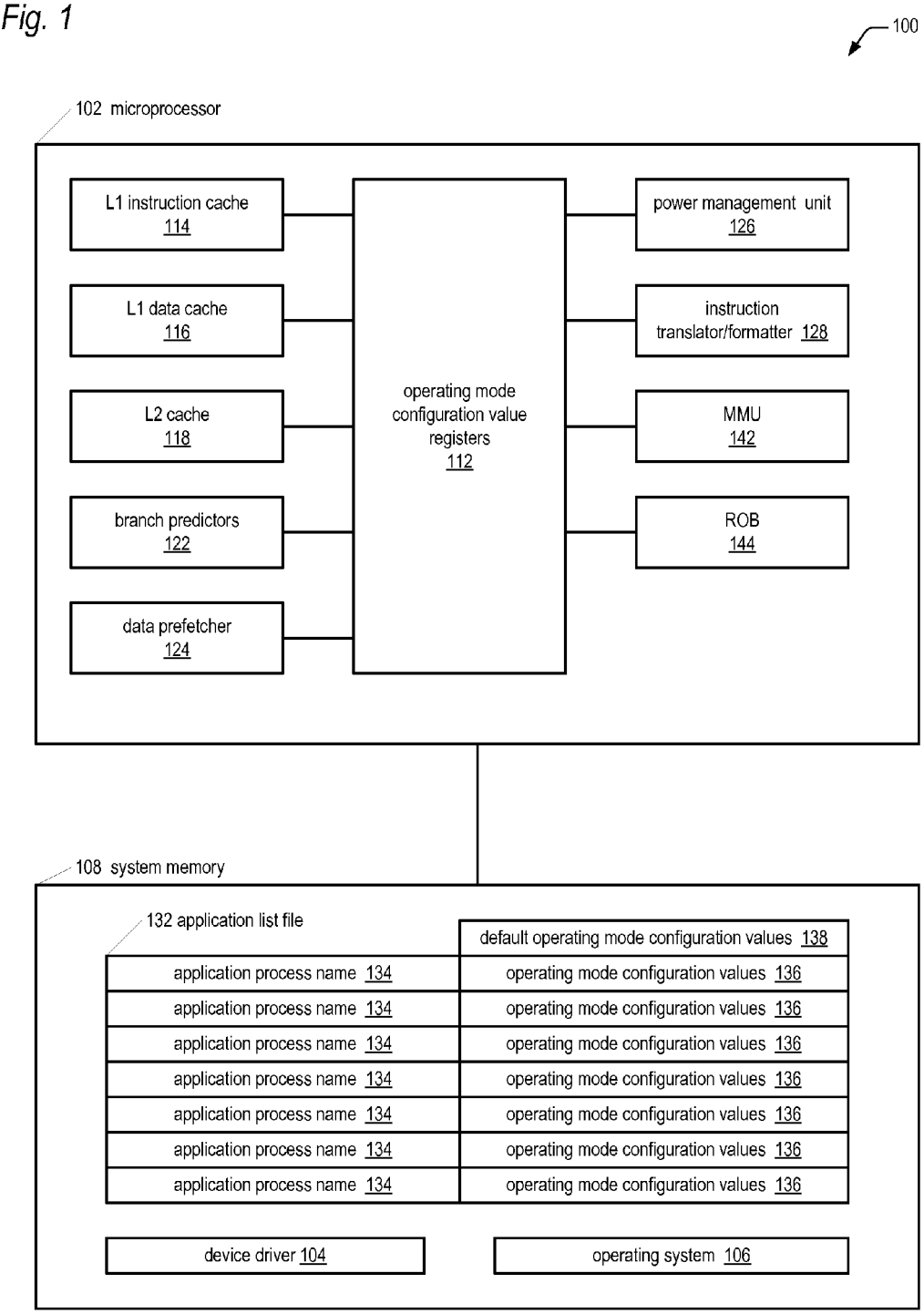
FIG. 1 is a block diagram illustrating a computing system that includes a microprocessor and device driver according to the present invention.

A device driver monitors the software applications currently in the operating system's set of running programs and dynamically writes values to the microprocessor to configure its operating modes optimally for the currently running software applications. The device driver may configure the optimum operating modes with respect to performance and/or power consumption. The term "device driver" is used herein to denote a device driver in the traditional sense of the term, as well as a dynamic link library or other software component that is privileged to write directly to the microprocessor to change an operating mode thereof. The term "software application" is used herein to denote a software application in the traditional sense of the term, as well as a dynamic link library or other software component that an operating system presents as a running process. In particular, the device driver periodically queries the operating system for the process names of the currently running processes and compares them with the names of software applications that are in a list of applications for which the microprocessor designer has determined an optimum operating mode configuration of the microprocessor for each application. In one embodiment, the list is contained in an encrypted file accessed by the device driver. In one embodiment, the list includes software that the microprocessor designers perceive as being important to their customers, including entities that evaluate microprocessors.

Referring now to FIG. 1, a block diagram illustrating a computing system 100 that includes a microprocessor 102 and device driver 104 according to the present invention is shown. The microprocessor 102 includes operating mode configuration value registers 112 that are written by the device driver 104. The microprocessor 102 also includes functional units, namely: a level-1 instruction cache 114, a level-1 data cache 116, a level-2 cache 118, branch predictors 122, a data prefetcher 124, a power management unit 126, an instruction translator/formatter 128, a memory management unit (MMU) 142, and a reorder buffer (ROB) 144. Each of the functional units may be configured by the device driver 104 to one or more operating modes according to the contents of the operating mode configuration value registers 112. In alternate embodiments there may be fewer, more, or different functional units than shown in FIG. 1.

The microprocessor 102 is coupled to a system memory 108. The system memory 108 stores the device driver 104, an operating system 106, and an application list file 132. The device driver 104 and application list file 132 may be initially stored in non-volatile memory such as a disk drive of the system (not shown) and loaded into system memory 108 by the operating system 106. The application list file 132 includes a plurality of entries each having an application process name 134 and a set of operating mode configuration values 136 associated with the application process name 134. The application list file 132 also includes default operating mode configuration values 138. It should be understood that the term "software applications" is not limited to the meaning attributed in some contexts, such as user software applications like Microsoft Word or Adobe Acrobat. Rather, the term "software application" or "application" as used herein may refer to any software thread that may execute as a separate process identifiable by the operating system, which may include user software application threads, threads of the operating system itself, other device drivers such as audio or video drivers, dynamic link libraries, and so forth. A software thread is a sequence of program instructions.

Referring now to FIG. 2, a block diagram illustrating various operating mode configuration values 136 of FIG. 1 according to the present invention is shown. The operating mode configuration values 136 include a data prefetch mode field 202, a branch prediction mode field 204, an instruction cache eviction mode field 206, a suspend execution mode field 208, an L1 instruction cache memory size field 212, an L1 data cache memory size field 214, an L2 cache memory size field 216, a translate/format size field 218, a speculative tablewalk field 222, an L1 cache miss behavior field 224, a forwarding hash field 226, a queue size field 228, an issue size field 232, a ROB size field 234, an out-of-orderness field 236, a load delay field 238, and a non-temporal load/store field 242. It should be noted that the list of operating mode configuration values 136 is given by way of example, and other embodiments are contemplated in which the microprocessor 102 includes other operating mode configuration values. The operating mode configuration value registers 112 of FIG. 1 include a field corresponding to each of the operating mode configuration values 136 shown in FIG. 2.

The data prefetch mode field 202 configures how data is prefetched from system memory 108 into the various cache memories 114/116/118 of the microprocessor 102. For example, the device driver 104 may configure the microprocessor 102 to prefetch highly likely predicted data directly into the L1 data cache 114, and/or to prefetch less likely predicted data into a dedicated prefetch buffer separate from the L1 or L2 data caches 116/118. For another example, the device driver 104 may disable data prefetching by the data prefetcher 124 for applications that consistently trigger unneeded prefetches. For another example, the device driver 104 may disable the data prefetcher 124 from performing prefetches requested by prefetch instructions in a software application because they tend to negatively interact with prefetches initiated internally by the microprocessor 102.

The branch prediction mode field 204 configures the manner in which the microprocessor 102 predicts branch instructions. For example, the device driver 104 may configure the number of branch instructions that the branch predictor 122 can predict from each line of the instruction cache 114. Additionally, the device driver 104 may configure the number of unique branch prediction mechanisms used by the branch predictors 122. Furthermore, the device driver 104 may configure the branch predictors 122 to assume whether a reverse JZ (jump on zero) branch instruction is usually taken or not taken. Still further, the device driver 104 may configure a hashing algorithm used for indexing into a branch target address cache (BTAC) within the branch predictors 122. Finally, the device driver 104 may configure the branch predictors 122 to temporarily disable branch prediction altogether, or to temporarily disable portions of the branch prediction mechanism, such as a branch target address cache (BTAC) within the branch predictors 122, if one or more of the currently running software applications in the predetermined list tend to execute highly unpredictable branch instructions.

The instruction cache eviction mode field 206 configures the algorithm the microprocessor 102 uses to evict instructions from the instruction cache 114.

The suspend execution mode field 208 configures whether the microprocessor 102 temporarily suspends executing program instructions. For example, the device driver 104 may configure the microprocessor 102 to temporarily suspend executing instructions in response to determining that the idle process of the operating system 106 has been executing for a predetermined amount of time.

The L1 instruction cache memory size field 212, L1 data cache memory size field 214, and L2 cache memory size field 216 configure the size of the L1 instruction cache, L1 data cache, or L2 cache memory, respectively. For example, the device driver 104 may configure the cache memory sizes based on the size of the working data set of one or more of the currently running software applications.

The translate/format field 218 configures how the translator/formatter 128 translates and/or formats instructions. For example, the device driver 104 may configure how many instructions the instruction translator/formatter 128 translates and/or formats each clock cycle, such as, the device driver 104 may configure the instruction translator/formatter 128 to translate and/or format only a single instruction per clock cycle in order to lower the power consumption of the microprocessor 102 when this will suffice based on the running applications. Additionally, the device driver 104 may configure the translator/formatter 128 to disable it from merging instructions in order to reduce power consumption.

The speculative tablewalk field 222 configures whether the MMU 142 performs speculative page tablewalks in response to a TLB miss. For example, the device driver 104 may configure the MMU 142 to disable speculative tablewalks for an application that causes the speculations to be consistently incorrect, thereby evicting otherwise useful entries in the TLB. In one embodiment, the device driver 104 may configure the magnitude of the speculation of the tablewalk. For example, the device driver 104 may configure the MMU 142 to only perform a speculative page tablewalk after all older store operations have been retired, or after all older store operations have their addresses resolved, or without regard for older store operations.

The L1 cache miss behavior field 224 configures whether MMU 142, in response to a miss in the L1 instruction cache 114, requests data from the L2 cache 118 and the processor bus in a serial or parallel fashion.

The forwarding hash field 226 configures algorithm used by the microprocessor 102 to hash virtual address bits in address comparisons to detect whether the microprocessor 102 should perform a data forwarding operation, such as to a load instruction from an older, unretired store instruction, or between a load queue and a fill queue. For example, the device driver 104 may configure the microprocessor 102 to specify the number of bits in addition to the page index bits of the virtual address that will be compared, which of the non-page index bits will be hashed to generate those bits, and how the chosen bits will be hashed.

The queue size field 228 configures the usable size of various queues within the microprocessor 102, such as store queues, load queues, and cache line fill queues. For example, the device driver 104 may configure the various queues to smaller sizes in order to reduce the amount of power consumption when smaller queues will suffice based on the running applications.

The issue size field 232 configures the number of instructions that the microprocessor 102 will issue to the various execution units in a single clock cycle. For example, the device driver 104 may configure this to a relatively smaller value in order to reduce the amount of power consumption when a smaller number of instructions issued per clock cycle will suffice based on the running applications.

The ROB size field 234 configures the number of usable entries in the ROB 144. For example, the device driver 104 may configure the number of ROB 144 entries to a relatively small number in order to reduce the amount of power consumption when a smaller number of ROB 144 entries will suffice based on the running applications.

The out-of-orderness field 236 configures aspects of how the microprocessor 102 employs out-of-order execution of instructions. For example, the device driver 104 may configure the microprocessor 102 to execute instructions in strict program order (i.e., no out-of-order execution), or the device driver 104 may configure how deep within the instruction window the instruction dispatcher may look for independent instructions to issue for execution to the execution units.

The load delay field 238 configures whether a load delay mechanism of microprocessor 102 is disabled or enabled. In one embodiment, the microprocessor 102 speculatively issues a load instruction and may have to replay the load instruction if it depends upon an older store instruction from which the data is not yet available, which may be deleterious to performance. To reduce the likelihood of the replay, the load delay mechanism selectively delays the issue of a load instruction based on past history of the load instruction having been replayed. However, some software applications may exhibit a tendency to perform worse when the load delay mechanism is enabled. Thus, for example, the device driver 104 may disable the load delay mechanism for a software application that exhibit this tendency.

The non-temporal load/store field 242 configures the microprocessor 102 behavior for load/store instructions that include a non-temporal data hint to prevent the microprocessor 102 from caching their data. Some software applications may have been written to employ the non-temporal load/store instructions with the assumption that the data caches within the microprocessor 102 are smaller than the actual data cache sizes of the microprocessor 102 and might execute faster if the data were cached. Thus, for example, the device driver 104 may configure the microprocessor 102 to cache data specified by load/store instructions that include a non-temporal data hint. Additionally, the device driver 104 may configure the number of load buffers within the microprocessor 102 that are available to load/store instructions that include a non-temporal data hint.

Referring now to FIG. 3, a flowchart illustrating operation of the system of FIG. 1 according to the present invention is shown. Flow begins at block 302.

At block 302, the microprocessor 102 is reset, such as by a power on event or by assertion of its reset pin. In response to the reset, the microprocessor 102 configures itself to default operating modes. The default operating modes may be hard-coded into the microprocessor 102 and may be additionally configured by fuses of the microprocessor 102. Flow proceeds to block 304.

At block 304, the operating system 106 boots and invokes the device driver 104. The device driver 104 periodically monitors the currently running processes. In particular, the device driver 104 queries the operating system 106 for the process name of each currently running process and compares them with the application process names 134 of the application list file 132. In one embodiment, the device driver 104 performs the steps at blocks 304 through 314 in response to the operating system 106 invoking a routine of the device driver 104 when a timer tick of the operating system 106 occurs. Flow proceeds to decision block 306.

At decision block 306, the device driver 104 determines whether the comparisons performed at block 304 yielded any matches. If the device driver 104 detects matches, flow proceeds to block 308; otherwise, flow proceeds to block 312.

At block 308, the device driver 104 reads the operating mode configuration values 136 from the matching entry in the application list file 132 and writes them to the operating mode configuration value registers 112 in order to configure the microprocessor 102 to the optimal operating modes for the currently running application whose application process name field matched at decision block 306. In one embodiment, the applications included in the application list file 132 are ranked by importance of software application, and if the device driver 104 determines multiple matches at decision block 306, the device driver 104 configures the microprocessor 102 with the operating mode configuration values 136 from the entry associated with the most important matching application. In one embodiment, the application list file 132 may include operating mode configuration values 136 associated with various combinations of currently running software applications for optimizing their performance and/or power consumption as a group, and if the device driver 104 determines multiple matches associated with one of the combinations, the device driver 104 configures the microprocessor 102 with the operating mode configuration values 136 from the entry associated with the matching combination of applications. Flow proceeds to block 314.

At block 312, the device driver 104 reads the default operating mode configuration values 138 from the application list file 132 and writes them to the operating mode configuration value registers 112 in order to configure the microprocessor 102 to the default operating modes since none of the applications specified in the application list file 132 are currently running. Flow proceeds to block 314.

At block 314, the microprocessor 102 configures the corresponding operating modes of its various functional units based on the operating mode configuration values 136 written at block 308 or 312. Flow returns to block 304. In one embodiment, as discussed above, flow returns to block 304 in response to a timer tick of the operating system 106.

Although embodiments have been described with respect to particular configurable operating modes 136, these are given by way of example, and other embodiments are contemplated in which the microprocessor 102 includes other configurable operating modes and the device driver 104 is written to program these additional operating mode configuration values into the microprocessor 102.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. The present invention is implemented within a microprocessor device which may be used in a general purpose computer.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A computing system, comprising:
   a microprocessor, configured to receive values for configuring operating modes of the microprocessor, wherein the microprocessor is further configured to execute an operating system that controls which software applications are currently running on the microprocessor; and
   a device driver, configured to monitor which of the software applications currently running on the microprocessor are in a predetermined list of software applications and to responsively dynamically write the values to the microprocessor to configure its operating modes.

2. The computing system of claim 1, wherein each entry in the predetermined list includes a process name and associated values for configuring operating modes of the microprocessor for the software application having the associated process name.

3. The computing system of claim 2, wherein the device driver is configured to periodically compare process names of the software applications currently running on the microprocessor with the process name in each entry in the predetermined list and to write the values in a matching entry to the microprocessor to configure its operating modes.

4. The computing system of claim 1, wherein the device driver is configured to write default values to the microprocessor to configure it to a default operating mode when none of the software applications currently running on the microprocessor are in the predetermined list of software applications.

5. The computing system of claim 1, wherein the values comprise a value for configuring a manner in which the microprocessor prefetches data from system memory into its cache memory.

6. The computing system of claim 1, wherein the values comprise a value for configuring a manner in which the microprocessor predicts branch instructions.

7. The computing system of claim 1, wherein the values comprise a value for configuring a manner in which the microprocessor evicts instructions from its instruction cache memory.

8. The computing system of claim 1, wherein the values comprise a value for configuring the microprocessor to temporarily suspend executing instructions.

9. The computing system of claim 1, wherein the values comprise a value for configuring the microprocessor to temporarily disable portions of its branch prediction mechanism.

10. The computing system of claim 1, wherein the values comprise a value for configuring the size of a cache memory of the microprocessor.

11. The computing system of claim 1, wherein the values comprise a value for selectively disabling prediction of branch instructions by a branch target address cache of the microprocessor.

12. The computing system of claim 1, wherein the values comprise a value for configuring a hashing algorithm for indexing into a branch target address cache of the microprocessor.

13. The computing system of claim 1, wherein the values comprise a value for configuring whether a default prediction for a branch instruction is taken or not taken.

14. The computing system of claim 1, wherein the values comprise a value for configuring a number of instructions translated per clock cycle by the microprocessor.

15. The computing system of claim 1, wherein the values comprise a value for configuring a number of variable length instructions formatted per clock cycle by the microprocessor.

16. The computing system of claim 1, wherein the values comprise a value for selectively disabling a load delay mechanism of the microprocessor.

17. The computing system of claim 1, wherein the values comprise a value for selectively disabling speculative page table walks by the microprocessor.

18. The computing system of claim 1, wherein the values comprise a value for selectively disabling software prefetching by the microprocessor.

19. The computing system of claim 1, wherein the values comprise a value for selectively disabling the microprocessor from merging instructions.

20. The computing system of claim 1, wherein the values comprise a value for configuring whether the microprocessor, in response to a miss of its first-level instruction cache thereof, requests missing instructions from its second-level cache and processor bus in series or in parallel.

21. The computing system of claim 1, wherein the values comprise a value for configuring the microprocessor to cache data specified by load/store instructions that include a non-temporal data hint.

22. The computing system of claim 1, wherein the values comprise a value for configuring a hashing algorithm employed by the microprocessor to perform data forwarding.

23. The computing system of claim 1, wherein the values comprise a value for configuring the size of a reorder buffer of the microprocessor.

24. The computing system of claim 1, wherein the values comprise a value for configuring the size of a store queue, load queue, or fill queue of the microprocessor.

25. The computing system of claim 1, wherein the values comprise a value for configuring the number of instructions the microprocessor issues per clock cycle.

26. The computing system of claim 1, wherein the values comprise a value for configuring an extent to which the microprocessor executes instructions in an out-of-order fashion.

27. A method for configuring a computer system having a microprocessor and a device driver, the method comprising:
receiving, by a microprocessor, values for configuring operating modes of the microprocessor, wherein the microprocessor is configured to execute an operating system that controls which software applications are currently running on the microprocessor;
monitoring which of the software applications currently running on the microprocessor are in a predetermined list of software applications; and
dynamically writing the values to the microprocessor to configure its operating modes, in response to said monitoring;
wherein said monitoring and said dynamically writing are performed by a device driver.

28. The method of claim 27, wherein each entry in the predetermined list includes a process name and associated values for configuring operating modes of the microprocessor for the software application having the associated process name.

29. The method of claim 28, further comprising:
periodically comparing process names of the software applications currently running on the microprocessor with the process name in each entry in the predetermined list; and
writing the values in a matching entry to the microprocessor to configure its operating modes;
wherein said periodically comparing and said writing the values in a matching entry to the microprocessor are performed by the device driver.

30. The method of claim 27, further comprising:
writing default values to the microprocessor to configure it to a default operating mode when none of the software applications currently running on the microprocessor are in the predetermined list of software applications;
wherein said writing default values is performed by the device driver.

31. The method of claim 27, wherein the values comprise a value for configuring a manner in which the microprocessor prefetches data from system memory into its cache memory.

32. The method of claim 27, wherein the values comprise a value for configuring a manner in which the microprocessor predicts branch instructions.

33. The method of claim 27, wherein the values comprise a value for configuring a manner in which the microprocessor evicts instructions from its instruction cache memory.

34. The method of claim 27, wherein the values comprise a value for configuring the microprocessor to temporarily suspend executing instructions.

35. The method of claim 27, wherein the values comprise a value for configuring the microprocessor to temporarily disable portions of its branch prediction mechanism.

36. The method of claim 27, wherein the values comprise a value for configuring the size of a cache memory of the microprocessor.

37. The method of claim 27, wherein the values comprise a value for selectively disabling prediction of branch instructions by a branch target address cache of the microprocessor.

38. The method of claim 27, wherein the values comprise a value for configuring a hashing algorithm for indexing into a branch target address cache of the microprocessor.

39. The method of claim 27, wherein the values comprise a value for configuring whether a default prediction for a branch instruction is taken or not taken.

40. The method of claim 27, wherein the values comprise a value for configuring a number of instructions translated per clock cycle by the microprocessor.

41. The method of claim 27, wherein the values comprise a value for configuring a number of variable length instructions formatted per clock cycle by the microprocessor.

42. The method of claim 27, wherein the values comprise a value for selectively disabling a load delay mechanism of the microprocessor.

43. The method of claim 27, wherein the values comprise a value for selectively disabling speculative page table walks by the microprocessor.

44. The method of claim 27, wherein the values comprise a value for selectively disabling software prefetching by the microprocessor.

45. The method of claim 27, wherein the values comprise a value for selectively disabling the microprocessor from merging instructions.

46. The method of claim 27, wherein the values comprise a value for configuring whether the microprocessor, in response to a miss of its first-level instruction cache thereof, requests missing instructions from its second-level cache and processor bus in series or in parallel.

47. The method of claim 27, wherein the values comprise a value for configuring the microprocessor to cache data specified by load/store instructions that include a non-temporal data hint.

48. The method of claim 27, wherein the values comprise a value for configuring a hashing algorithm employed by the microprocessor to perform data forwarding.

49. The method of claim 27, wherein the values comprise a value for configuring the size of a reorder buffer of the microprocessor.

50. The method of claim 27, wherein the values comprise a value for configuring the size of a store queue, load queue, or fill queue of the microprocessor.

51. The method of claim 27, wherein the values comprise a value for configuring the number of instructions the microprocessor issues per clock cycle.

52. The method of claim 27, wherein the values comprise a value for configuring an extent to which the microprocessor executes instructions in an out-of-order fashion.

53. The computing system of claim 3, wherein the device driver is configured to periodically query the operating system for the process names of the software applications currently running on the microprocessor prior to comparing them with the process name in each entry in the predetermined list.

54. The computing system of claim 1, wherein the operating modes of the microprocessor comprise a plurality of non-architectural operating modes.

55. A computer program product for use with a computing device, the computer program product comprising:
 a non-transitory computer usable storage medium, having computer readable program code embodied in said medium, the computer readable program code comprising:
  first program code for periodically querying an operating system for software applications currently running on a microprocessor including a plurality of functional units having configurable operating modes; and
  second program code for writing a plurality of configuration values to the microprocessor to configure the functional unit operating modes in response to the currently running software applications, wherein the configuration values are predetermined to configure the functional units optimally with respect to performance and/or power consumption for one or more of the currently running software applications.

\* \* \* \* \*